United States Patent [19]

Parnell

[11] Patent Number: 4,479,032
[45] Date of Patent: Oct. 23, 1984

[54] DIGITIZING CURSOR AND COORDINATE GRID SYSTEM

[75] Inventor: James A. Parnell, Austin, Tex.

[73] Assignee: Bausch & Lomb Incorporated, Rochester, N.Y.

[21] Appl. No.: 346,792

[22] Filed: Feb. 8, 1982

[51] Int. Cl.³ ............................................. G08C 21/00
[52] U.S. Cl. ...................................... 178/19; 364/520; 33/1 M
[58] Field of Search ..................... 364/520; 170/18, 19; 340/706, 709; 33/1 M

[56] References Cited

U.S. PATENT DOCUMENTS

| | | | |
|---|---|---|---|
| 3,801,733 | 4/1974 | Bailey | 178/18 |
| 3,875,331 | 4/1975 | Hasenbalg | 178/19 |
| 4,206,314 | 6/1980 | Prugh et al. | 364/520 |
| 4,260,852 | 4/1981 | Fencl | 178/19 |

*Primary Examiner*—Stafford D. Schreyer
*Attorney, Agent, or Firm*—Bernard D. Bogdon; John S. Norton

[57] ABSTRACT

A digitizer cursor is provided with a multifunctional control panel. The panel is comprised of a multiplicity of switches for defining various modes of cursor operation in use with a digitizer coordinate axes grid assembly or pad. Novel circuitry provides for a cursor of convenient size with a complex control panel in combination with a point locating device used in conjunction with the coordinate grid assembly. The circuitry provides for electrical communication through a coaxial cable permitting easy maneuverability of the cursor assembly relative to the pad and a simple electrical path for processing of the cursor coil induced point location signal, to determine coordinate location, and the cursor control signals originating as a function of switch operation initiated on the cursor panel by the operator. One digitizer grid pattern is used for each of two coordinate axes, i.e. X and Y. Each grid pattern is used for coarse and fine digitizing to determine cursor positioning on each respective axis. The digitizer has two basic modes of operation which relate to digitally representing the position of a cursor on a grid pattern. The first mode is for coarse digitizing designed to identify the position of the cursor within 1½ grid lines of its actual position on the grid. The second mode is the fine digitizing mode which is operative to positively locate the cursor at its actual position within a triad of grid lines which have been identified through the coarse digitizing operation. Both modes are operative for each of the two axes. For coarse digitizing, a sequential line-to-ling pulsing technique is applied. For fine digitizing, a pulsed three phase system is utilized and any odd multiple of three grid lines.

2 Claims, 6 Drawing Figures

DIGITIZING CURSOR AND COORDINATE GRID SYSTEM

BACKGROUND OF THE INVENTION

This invention relates to digitizing apparatus for converting graphical information into digital values and more particularly to improved digitizing cursor control circuitry processing of control and digitizing signals through a coaxial cable.

SUMMARY OF THE INVENTION

A digitizer (somtimes called a tablet or a pad) is an input device converting graphic information into digital values usable by a processor/computer.

Within the digitizer tablet is an electronic grid. By pointing to any point on the tablet with a suitable electronic device, that point can be located very precisely. One type of "pointing" device is a hand held cursor with fine cross hairs to accurately pick out the point. Some cursors have a degree of optical magnification to better place the cross hairs.

The stylus and cursors have buttons or switches that are depressed when the desired point is reached. The X-Y coordinates (called a coordinate pair) of that point are then electronically picked up and registered in the processor/computer in a digital form that the computer can recognize and use for computation. This type of usage is called the Point mode of a digitizer, especially good for entering the first and last point of a straight line for example, as the entire line is easily entered with only these two points.

By following a curved line and occasionally pressing the cursor point button, the X-Y coordinates for each of these points will be entered into the computer. The further apart these chosen points are, the coarser the computer's reproduction of that curved line will appear. Conversely, the closer and more points on the curve inputted, the more faithfully the computer can reproduce the curve. This can be very tedious and boring if many points are entered in this way. So, another method of entering these points is available.

On the face of the digitizer table is a series of control buttons. The above description assumed the Point Mode button had been depressed. If the Switch Stream button is depressed, entering points on that curved line becomes easier. Now one needs only to press the cursor at the first point on the curve and move it carefully and smoothly along the curve while holding down the cursor button. Automatically, at a preset rate, points on the curve will be picked up and entered into the computer. In this manner, up to 200 points per second (coordinate pairs per second) can be entered. At the end of the curve, merely release the pressure on the stylus or the cursor button and the operations will stop.

Other mode buttons on the tablet include Stream and Incremental. For purposes of this discussion, these two modes of operation are similar to Switch Stream. The Stream mode differs in that the cursor button does not need to be depressed. Instead, a proximity sensor built into the system starts the data pick-up when the cross hair intersection of the cursor is within recognition distance of the point.

The Incremental mode differs from the Switch Stream mode in that rather than picking up coordinate pairs at a rate (example: 200 per second) the incremental mode picks up coordinate pairs only after the cursor is moved a minimum preset distance.

All of this is made simple by unique circuitry format including microprocessors. Scores of combinations of switch positions on the panel of the control box allow the operator to set up the system for very specific applications. Or, all these switch combinations can be controlled by the computer (called down-loading) so that the operator need not be concerned with all these combinations.

There are two other control buttons, one is Reset Origin and by depressing this button, the traditional origin (X=0, Y=0) of the tablet will be located at the lower left-hand corner of the tablet. Just as on a gridded sheet of paper, the lower left-hand corner is 0,0. To accomplish this particular origin reset, the cursor is moved to the lower left-hand corner of the tablet. With the cursor button depressed, the cursor is moved around until an audible or visible indication is given. At this point, the origin has been set to 0,0. Another is Relocate Origin and if the origin (X=0, Y=0) is to be relocated from the lower left-hand corner, depress the Relocate Origin button. Place the stylus or cursor to the point where the origin is to appear. Press the button on the cursor and a new origin is defined.

The basic elements providing the advantages set forth above include a novel cursor assembly and digitizing board combining to implement a unique digitizing process. The cursor assembly is adapted for easy maneuverability about the surface of the digitizer board. The cursor is of convenient size, but yet has included on its front panel for easy access to the operator, a multiplicity of control switches for implementing at least the operational modes hereinbefore identified. A coaxial cable connected to the cursor assembly in combination with novel control and processing circuitry allows for easy manipulation of the cursor assembly over the surface of the digitizing board and for a control panel providing for a wide variety of operational choices for one-hand use by the operator during the manipulation of the cursor assembly. The coaxial cable has a single center conductor.

The novel digitizing approach includes electromagnetically coupling a coil within the cursor assembly with electrically energized grid lines within the digitizing board.

This digitizer is capable as an absolute measuring system where the cursor position is relative to a definite origin of an X and Y coordinate pattern. One grid pattern is used for each of the two coordinate axes and each grid pattern is used for coarse and fine digitizing. A preferred grid line spacing is 0.2 inches.

In the coarse digitizing mode, uniquely accomplished before fine digitizing occurs, each grid line is pulsed or strummed sequentially by logic switching circuitry connected to one end of each grid line with the other end connected to a current source. The sequential operation is provided to determine the approximate location of the cursor. Each line is turned on and then turned off before the next digitizing line is turned on and then off and the sequence travels from left to right across the working surface of the pad. Alternative sequencing patterns are possible.

A square current pulse of a value of approximately 25 to 30 millamperes passes through each of the grid lines and inductively couples with the coil of the cursor. Each induced or generated cursor pulse is sampled at the time of the occurrence of the center of the square grid line pulse or some predetermined time thereafter.

The generated cursor pulse generally increased in amplitude with each grid line as the cursor coil center is approached from the left during the scan of the grid lines. For a cursor which has its coil center located exactly on a grid line, no pulse is produced by the cursor corresponding to that line over which it is centered. Further, the first line to the right of and center of a cursor coil centered on a grid line will produce a reversed polarity pulse as compared to the grid line to the left of the cursor coil center. Typically, where the cursor coil center is directly over a line, the first cursor pulse to the right will have a value greater than a predetermined threshold level. The threshold level is of such value so as to insure that noise and any other normal system interferences do not erroneously influence the digitization of the cursor signal. Further the threshold level provides control for the height the cursor coil can be above the pad and still be operational.

In instances where the cursor is not exactly centered on a grid line, the first negative pulse generated by the cursor may be of a lesser value than the preceding pulse and further may be of a value which is not equal to or greater than the threshold level. In such instances when the threshold level is not reached by the cursor pulse corresponding to the first grid line to the right past the cursor coil center, the second grid line to the right past the center of the cursor coil will provide the indication of the approximate or coarse position for the cursor.

In the digitizing process employed in this inventive approach, the coarse digitizing technique provides identification of the coordinate location of the point being digitized within a group of grid lines. A preferred embodiment identifies this grid line group as including three lines. It is within this triad that the point has been located. The fine digitizing mode centers its search for the exact coordinate location of the point about this triad. Notwithstanding this approximate coarse locating technique, it is still worthwhile to note that the identified approximate cursor location is never more than 1½ lines from its true location.

Under certain circumstances, due to noise interferences, for example, the coarse digitizing operation may select a grid line in the triad to the left of the triad where the cursor coil is actually located. This is particularly true where the cursor coil center is in the vicinity of the boundary between those triads. Counters under such circumstances are not sufficiently stable to overcome these deficiencies, therefore this equivocal result. As hereinafter explained the fine digitizing process compensates for this component uncertainty.

Whenever coarse digitizing is taking place, and a cursor location has been approximated, a repeat process occurs to verify the first identified approximate location. For example, whenever there is a reversal of the pulse signal generated by the cursor which is of a value greater than the set threshold level, the system operation backs up 2 grid lines to the left and repeats the scanning or sequencing technique to comparatively analyze the second signal to be generated by the cursor. If the comparison is favorable, then it is assumed that the approximate location of the cursor has been found. Alternatively, the system could back up to the far left-hand margin of the pad or to the zero point and start operating there to once again determine the location of the cursor.

It is expected that for every point digitized, a coarse digitizing operation will be performed. Under circumstances where the rate of cursor movement is controlled, coarse digitizing operations could be minimized. A low cost digitizer could be constructed according to the above outlined coarse digitizing technique where each grid could comprise 1024 grid lines. Every 32nd grid line would be electrically connected together at one end, called the top, with every adjacent grid line, in groups of 32, tied together at the other end, called the bottom. So that, for example, the same current drive is connected at the top to lines 1 and 33, and another drive to lines 2 and 34, etc. At the bottom, lines 1 through 32 are electrically connected together as are lines 33 through 64, lines 65 through 96, etc. This pattern is repeated 32 times and therefore only 64 switches are required, 32 at top and 32 at the bottom. The same drivers can be used for each axis when the digitizing is alternated between the X and Y axes.

For fine digitizing, a pulsed 3-phase system is utilized and any odd multiple of 3 (3, 9, 15, etc.) grid lines can be utilized. In practice, it is preferred that the 3-phase fine digitizing system comprises groups of 15 grid lines with the center triad of 3 lines being the spacing within which the coarse digitizing process located the cursor coil. Accordingly a maximum of 15 lines are driven during the fine digitizing mode.

Each line of each group of 15 is connected to the respective corresponding line of each other group of 15 in the total grid pattern for each axis. Each grid line is connected to a driver or current source. Since every 15th line is connected, there need only be 15, virtually identical, current sources per axis. The inputs of the current sources are connected to one of the three-phased signals. A one-phase voltage signal is equally applied to 5 voltage-to-current converters. The output of each of which is exactly in phase with the input voltage. The result is that there are 5 tracking identical current sources for each phase. The output end of each grid line connects to gating circuitry to turn any or all gates on or off as desired. Both axes are tied to the same current sources and different switches determine which axis is on.

Preferably, each group of the 15 grid wires is laid out on the board so that the input end-point of each grid line of each group of 15 is disposed in a line diagonal to the general parallel layout of the grid pattern. This arrangement provides for convenience of interconnection of the respective lines of each respective group of 15 wires.

For fine digitizing, the 15 lines centered on the triad where the cursor was approximately located are activated. This arrangement provides for minimizing left and right pad edge effects.

Since the approximate location of the cursor can be off as much as 1½ grid lines spacings, the cursor can never be less than 6 lines from the left or right edge of the group of 15 lines.

To accomplish the fine digitizing, a pulsed 3-phase system is utilized. This system is implemented after switching from the constant DC pulse which is employed during the coarse digitizing mode. The 3-phase system comprises passing digitally synthesized sine waves along each of the grid lines.

The circuit structure accomplishing fine digitizing for each of the 3-phases, comprises a counter symmetrically connected to 3 separate ROMS. The counter is driven by a high frequency oscillator. Each ROM is connected to a D/A converter. Each converter corresponds to 1 phase. The synthesized sine wave can be characterized as a pseudo sine wave and could be replaced by any repeatable but identical waveform. The waveform is to be symmetrical about its amplitude and time axes.

When the waveform generated by the cursor, as a result of the 3-phase pseudo sine waves passing through each triad, crosses zero or a threshold level in the same direction as the synthesized sine wave, the counter can be read-out and that count is representative of the phase shift that exists between the synthesized sine wave and the generated cursor sine wave. In the contemplated embodiment the location of 1½ lines to the left of the center of each 3 lines of a triad represents zero phase shift.

In the fine digitizing mode, as hereinbefore stated, the fine digitizing value obtained is to be between 0 and 0.6 inches. Since the coarse digitizing location is never off by more than 1½ lines or 0.3 inches and is identified to be after a given or nth grid line, where the pulse polarity reversed and was at least of threshold value, that grid line, in any triad, is known by the controller and known to be the 1st, 2nd or 3rd of such triad. If the 1st, the preceding triad or the triad of the 1st line can be selected as the center triad of the 5 triads of 15 lines. Assume the preceding triad is selected. The fine digitizing location value should in that case be between 0.3 inches and 0.6 inches. If the fine location value is found to be between 0 and 0.3 inches then the wrong center triad has been selected and the coarse value is adjusted by adding 0.6 inches to compensate for the assumption that the cursor was located in the adjacent left triad. Of course, the fine digitizing value is added to that sum, which total value represents the actual location of the cursor center on the pad for one of the two axes.

In operation, for example, the coarse digitizing may determine that the approximate cursor location is after the nth grid line and in the 10th triad from the left pad margin. Therefore, based upon 0.2 inch spacings between grid lines, the cursor is in the triad located between 5.4 inches and 6.0 inches. The fine digitizing operation then makes a refined location determination, presented as the digital counter value, which is based upon the phase shift between the generated cursor signal and a selected drive signal. Every 0.6 inches is equivalent to 360° phase shift. If a counter is going at a rate of 1024 for example, each count is equivalent to 0.6 divided by 1,024 or 6/10 of a mil approximately. The phase shift value, as represented by the counter, is then added to 5.4 (9×0.6) to identify the exact location of the cursor coil center.

DETAILED DESCRIPTION OF PREFERRED EMBODIMENT

Figure 1:
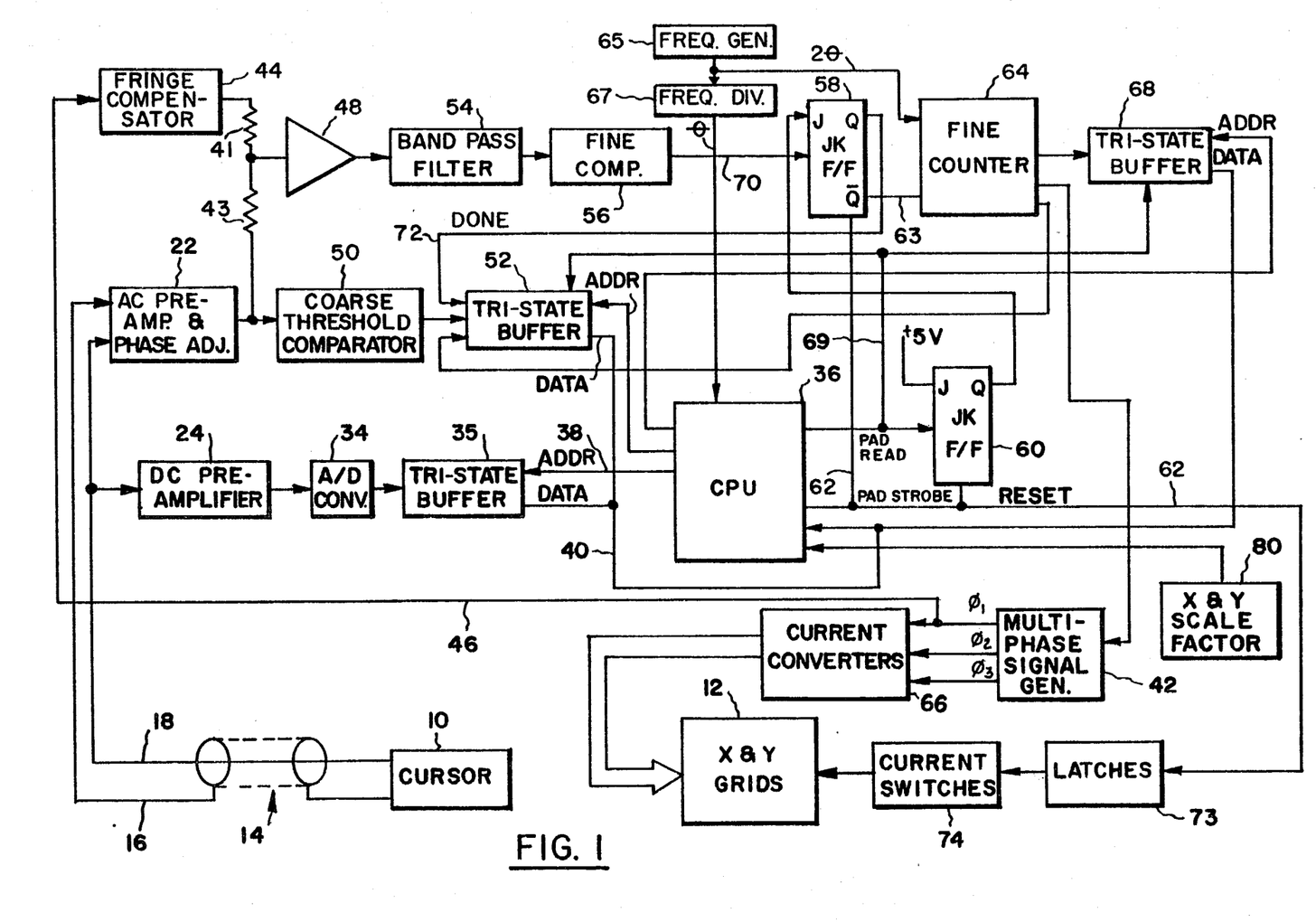
FIG. 1 is a functional block diagram of a digitizing system according to the principles of the present invention.
Figure 2:
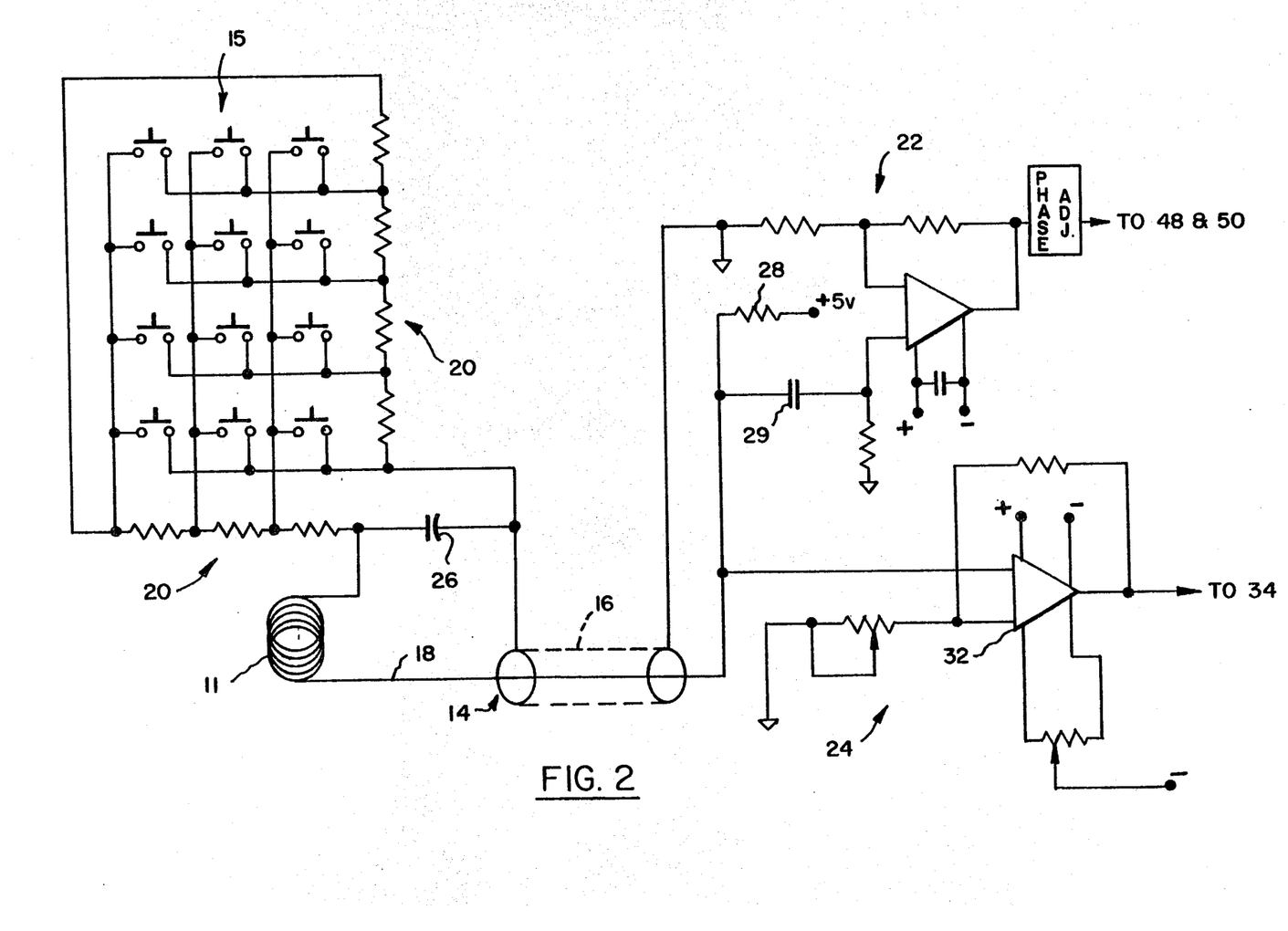
FIG. 2 is a functional schematic diagram of the cursor signal control and processing circuitry.
Figures 3, 4, 6:
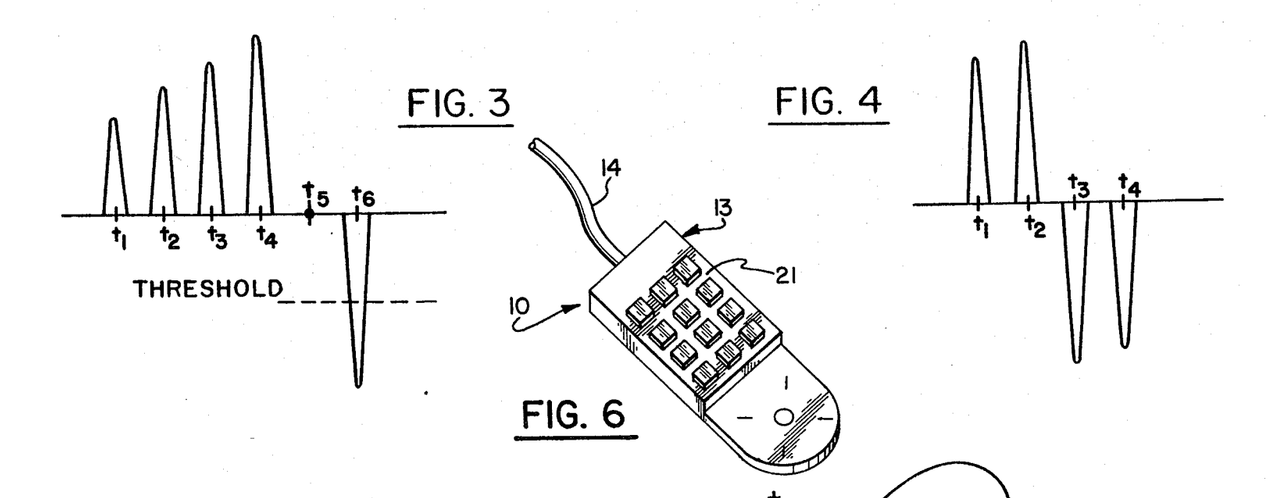
FIG. 3 is a typical graphical illustration of coarse digitizing signal response.
FIG. 4 is a specific graphical illustration of coarse digitizing signal response.
FIG. 6 is a perspective view of an exemplary cursor assembly housing, control panel and cross hairs.
Figure 5:
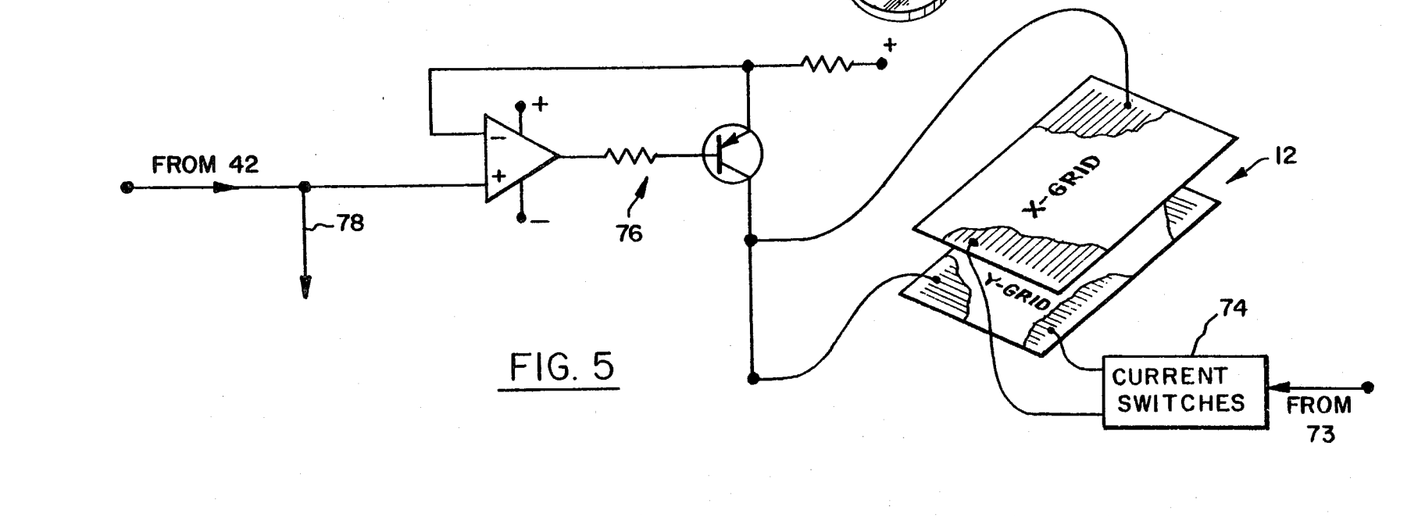
FIG. 5 is a general schematic and functional block diagram of the current and logic circuitry driving the coordinate grid lines of the grid assembly.

The cursor assembly 10 of FIG. 1, best seen schematically in FIG. 2 and pictorially in FIG. 6, includes a multi-turn coil 11. The coil 11 within a housing 13, illustrated in FIG. 2, is typically 300 turns of very fine wire. The mean diameter of the coil is related by a fixed constant to the spaces between the grid wires laid out in parallel fashion, as best seen in FIG. 5, in each of the X and Y grids in the grid assembly 12. The coil 11 and energized grid wires are inductively coupled. The core diameter of the coil 11 is empirically determined to get optimum performance and in one embodiment can be, for example, approximately one and one-half line widths. The spacing between the grid wires can be, for example, 0.2 inches.

The cursor assembly 10 is designed to include within its housing 13, for example, 12 push-buttons mounted in a control panel 21 and is further composed of a resistor network linked to the grid assembly 12 by a two-wire coaxial cable 14. This provides a simple cost effective link between the cursor assembly 10 and the digitizing control circuitry of the grid assembly 12. This is best illustrated in FIG. 2 where schematically the cursor assembly 10 is illustrated at the left side of the FIG. 2 to include the push-button matrix 15 and resistor network 20 coaxially connected by cable 14 to the AC preamplifier and phase adjuster 22 and DC preamplifier 24 of the digitizing circuitry.

Wire 16, the shield of the coaxial cable 14, is at ground. The center wire 18 transmits signal information pertinent to the analog circuitry for performing coarse and fine digitizing and connects to AC preamplifier and phase adjustor 22. The preamplifier portion of which is illustrated in detail in FIG. 2. The center wire 18 also transmits information to the processor pertinent to determining the particular push-button engaged and connects to DC preamplifier 24.

A capacitor 26 in parallel with the total resistance of resistor bank 20 yields a net impedance at the frequency for the digitizing process. This capacitor is large enough not to allow phase shift of the AC signal generated in the cursor coil 11 and passed into the controller circuitry for analysis. The capacitor creates a zeroing condition, effectively shorting out the resistive network 20 for the digitizing process. Therefore the push-button resistor network or bank 20 operates at DC only. As a result a multi-button cursor assembly 10 can be used with only the two output wires of the coaxial cable 14 going to the control digitizing circuitry.

It should be noted that component costs of the DC preamplifier 24 can be reduced if alternative wiring is provided between the cursor assembly 10 and the X and Y grid assembly 12. In such case an additional conductor would be incorporated to carry, for example, the DC switch matrix control signals.

A resistor 28 from the plus 5 volt rail in the preamplifier 22 of the digitizing section of the analog circuitry injects a DC current through the resistor bank 20 in the cursor assembly 10. The current supplied there develops a voltage across the resistor network 20. The resistor network 20 is arranged so that for each switch button of the matrix 15 pushed there is a corresponding change in voltage. Further, for each switch button pushed there is exactly the same increment in voltage developed. The voltage range typically developed is in order of several millivolts per step or switch. This voltage is amplified by a DC amplifier 32 in the DC preamplifier 24 up to a level that corresponds approximately from 0 to 5 volts swing, varying from the bottom button pushed to the top button pushed.

This amplified voltage signal is applied directly to the input of an A/D converter 34 in FIG. 1 which is an 8 bit A/D converter which digitizes the analog value into discrete steps. The central processing unit (CPU) 36 will on occasion interrogate the A/D converter 34 to see which push-button of the matrix 15 has been pushed. It does this by addressing on line 38 a tri-state buffer 35 which in effect connects the output of the A/D converter 34, which is 8 bits wide, onto the 8 bit data bus line 40 which goes to the CPU 36. Accordingly at any time the CPU 36 can determine which button has been pushed.

The CPU 36 has 16 address lines and 8 data lines. The address lines allow the CPU 36 to generate in one of approximately 65,000 on-and-off combinations of the 16 lines, i.e. $2^{16}$ combinations.

The AC component of the signal coming off the cursor coil 11 is amplified by the AC preamplifier and phase adjustor 22, illustrated in FIGS. 1 and 2. The capacitor 29 provides for AC coupling. This is a two-stage preamplifier with an approximate voltage gain of 5K and includes a phase adjusting network comprising a trimming resistor. Phase adjustment is necessary to compensate for phase shifts which occur in the cursor assembly 10 and in the preamplifier 22 of FIG. 1. This compensation is provided so that the signal going to the output of the preamplifier yields exactly 180° out of phase with one of the three basic phases used to drive the grid assembly 12, and for example, would be out of phase with $\phi_1$ signal.

When a substantial number and preferably all of the grid lines are turned on, on each side of the cursor coil 11 field variation is essentially nonexistant. When a lesser number of lines are on, on each side of the cursor, it is necessary to compensate for undesirable field variations which have an adverse affect on the induced cursor signal particularly when the height of the cursor above the pad of the digitizer grid is varied. Accordingly fringe compensation adjustment becomes necessary. A fringe field created by 15 wires, goes in and out of phase with the phase identified to the particular location of the cursor as the cursor is moved. The signal magnitude for a field where 15 wires are turned on varies by a factor of approximately 3. Wheras the affect, where only 9 wires of the grid are turned on, is a substantially greater affect and as much as a factor of 9.

Fringe compensation adjustment is accomplished by adjustment of a trimming resistor in fringe compensator 44. The output signal from fringe compensator 44 $\phi_1$ is summed with the output of the AC preamplifier and phase adjustor 22 through resistors 41 and 43 into the summing amplifier 48. There is practically no phase shift in the fringe compensator 44. The fringe compensator signal is 180° out of phase with the signal coming out the AC preamplifier and phase adjustor 22 when the cursor coil 11 is physically located exactly at the center of one triad of grid lines.

The amplitude of the output of the summing amplifier 48 is therefore essentially independent of cursor position on either axis.

The signal from the AC preamplifier and phase adjustor 22 is also applied directly to a coarse digitizing threshold comparator 50. This comparator 50 is used in the coarse digitizing process where one line at a time on either the X or Y grid is energized with a DC current pulse and the comparator 50 is looking for a signal level being picked up by the cursor coil 11 of the proper phase and magnitude to indicate that the closest line is just past the cursor coil 11 or arbitrarily to the right on the X grid, or upward on the Y grid. These signals can have the waveforms illustrated in FIGS. 3 and 4.

Lines are being energized starting from the zero end which for the X axis is the left-hand end and for the Y axis the bottom of the grid. The grid lines are sequentially strobed or strumming starting from the left side and as the strumming of the grid lines approaches the physical location of the cursor coil 11 the amplitude of the signal being picked up by the cursor coil 11 will gradually increase. When a line is first turned on, the signal picked up will be of a particular polarity. Of course, when the line is turned off the output will swing to the opposite polarity.

The CPU 36 is controlling the strumming action. Therefore, the time that the line is turned on and the cursor signal is sampled is defined. These times are indicated by the t characters in FIGS. 3 and 4. The polarity of the signal picked up by the cursor coil 11 therefore, in relation to the time that it is turned on, gives an indication of which side of the cursor coil 11 a particular grid line is located. The event being sought which gives rise to the location of the cursor coil 11 occurs upon the occasion of turning on a grid line where the signal picked up by the cursor coil 11 swings negative at that instant and projects a magnitude beyond a threshold level, which is typically 1 to 2 volts in amplitude.

The coarse digitizing comparator 50 receives from the preamplifier portion of the analog circuitry a signal identified to each particular grid line which signal, when of sufficient value, based upon the threshold setting of the threshold circuitry resistors, causes the comparator to trigger a signal, which signal identifies that the voltage generated in the cursor for a particular grid line, is of sufficient predetermined negative value to be identified to at least the first or second grid line past the center of the cursor coil. The comparator functions to trigger at any signal out of the preamplifier which is more negative than the voltage present across a control resistor. The signal from the comparator 50 then passes to a level shifter to make it ready for evaluation by the CPU 36.

When the CPU 36 recognizes this occurrence, it then registers that that particular line is the closest one just past the center of the cursor coil 11 and the sequential strumming stops. This coarse digitizing provides signal identification of the cursor location on the grid within one line space of the closest line. This process applies to both X and Y coordinate axes and accuracy is obtained to approximately one line space on either grid.

The coarse threshold comparator 50 is read by the CPU 36 through another tri-state buffer 52. The sequence is such that the CPU 36 strums a line and then addresses the tri-state buffer 52 and evaluates the output of that coarse comparator 50 which output represents the relationship condition between the last line and cursor coil 11. By looking at the events of that one line it can evaluate whether or not the previously defined phase change and magnitude conditions exist. The pulse must be at the proper amplitude and polarity at the sample time. There are several other connective lines to tri-state buffer 52, but for this particular sequence only that one line which goes onto the data bus is evaluated.

Having established through coarse digitizing the cursor coil 11 location, the fine digitizing process is called up to give the high resolution demanded by this system. The other path for the AC cursor signal from the AC preamplifier and phase adjustor 22 is to the summing amplifier 48. There it is added with the compensating signal from the fringe compensator 44. The sum of those signals is amplified there and it goes through a bandpass filter 54 to improve the signal-to-noise ratio and also to improve the waveform of the signal to provide what approaches a pure sine wave.

The signal generated at the multiphase signal generator 42 is at that point only a quasi sine wave. The signal generated does have stepping in the waveform, so the bandpass filter 54 smooths the waveform into a true sine wave and higher accuracy can be achieved.

This signal is applied to another comparator 56 for the fine digitizing. This comparator 56 is really a zero crossing detector. The output of the comparator 56 will shift from a zero to a plus output logic level, depending on whether the waveform is negative or positive, to detect which side of zero the waveform is on. This is used to determine exactly when the waveform goes through the zero value. The output of that comparator 56 is applied to a logic circuit composed of two J-K flip-flops 58 and 60.

The CPU 36, after it establishes a coarse digitized location of the cursor coil 11 will initialize a fine digitizing sequence by first resetting both of the flip-flops 58 and 60 by strobing the line 62 known as Pad Strobe. This line 62 is a multi-function line. It is also used in strobing the X and Y grids. In this way the flip-flops 58 and 60 are already reset by the strobing of the grid pad in the coarse digitizing process. They can also be reset by utilizing the Pad Strobe command. So when fine digitizing is initialized the flip-flops 58 and 60 start off first in a condition where the Q outputs are at zero and the $\overline{Q}$ outputs are high.

A fine digitizing counter 64 has an enable line 63 passing from the $\overline{Q}$ output of the J-K flip-flop 58. That fine counter 64 is enabled by the output of the flip-flop 58. The counter 64 is a 10 bit counter and is driven by a clock signal $2\theta$ coming from a frequency generator 65. The generator 65 clocks the system through the CPU 36 at signal $\theta$ originating from frequency divider 67, providing a signal at approximately 4.9 megahertz divided by 2.

The 10 bit counter 64 divides by $2^{10}$ or 1,024 so that the cycle on the counter 64 will be the clock frequency $2\theta$ divided by 1,024. The five most significant bits of the fine counter 64 are generated for a dual purpose. In one instance they are applied to the multiphase signal generator 42 into three lookup tables embedded in a read only memory (ROM).

Each lookup table is a sine lookup table which is displaced 120° out of phase with each of the other two. Number one is reference phase $\phi$ at zero degrees and number two is the second phase which is equivalent to a phase shift of 120° and number three is 120° phase shifted from the last or 240° in phase shift relation to number one. Simply stated, each lookup table can be defined as a table where a value can be put in to get a corresponding value out.

As an example, if a number is put into a sine lookup table you get the sine of that number out. So the output of the counter 64, which is just a binary number, when applied to the lookup table of the multiphase signal separator 42, causes the sine of that number or its multiple to be the output of the ROM. That sine value number is then used to generate the sine wave forms necessary for fine digitizing signal processing and grid interrogation. The five bits provide for 32 possible combinations from zero to 31. That represents a full cycle of the counter, so 360° can be divided up into 32 steps. A value less then 12 degrees per increment is achieved. This is the approximate resolution obtained on each sine wave. The output of the ROM will give us a number which is applied to a D/A converter, the output of which is applied to the current converter 66. Therefore, when the counter 64 is running, there are three wave forms being generated closely approximating sine waves which are applied to the X and Y grid assembly 12.

The second of the dual purposes of the fine counter 64 bit generation provides for all 10 bits of the counter being applied to the input of another tri-state buffer 68. Buffer 68 functions in the sequence of events of fine digitizing as follows. CPU 36 generates a Pad Read command which strobes a line 69 which goes to the clock input of the J-K flip-flop 60 and, also to the tri-state buffer 68. This again is a dual purpose command. The first time that the Pad Read command comes along, it will do nothing more than to cause the Q output of the flip-flop 60 to go high. This is because the J input to that flip-flop 60 is tied to plus 5 volts. That Q line is tied back to the J input of flip-flop 58 and at that point Q is low and $\overline{Q}$ is high. As long as $\overline{Q}$ is high the counter 64 can run. Therefore, the counter 64 will be running and will stay that way until the signal on line 70 from the output of the fine comparator 56 goes through zero. At such time it will clock flip-flop 58 to where Q will go high, $\overline{Q}$ will go low and the enable line 63 to the fine counter 64 goes low and stops the counter 64. At the same time that the Q line 72 goes high, there is a Done signal, as shown on line 72 in FIG. 1, to the tri-state buffer 52. The CPU 36 will interrogate that line 72 when this occurs.

So the sequence to do the fine digitizing is for the CPU 36 to issue the Pad Read command on line 69, which arms the fine cursor circuitry and sets up the flip-flop 58 so that it will read the next zero crossing with the fine comparator 56. When that happens a Done indication is given. The CPU 36 identifies this by repetitively looking at that output on line 72 through the tri-state buffer 52. When it sees the Done signal is active it goes out for another Pad Read. The CPU 56 reads the output of the counter 64. The time at which the output of the fine comparator 56 goes to zero gives a direct relation of the phase shift that is obtained between the cursor coil generated signal and the reference phase $\phi_1$. The counter 64 is being driven at a clock of $2\theta$ and all the sine waves are being generated from that same counter 64. Therefore the time at which the output of the fine comparator 56 goes through zero in a known direction has a direct relationship to the phase shift between the cursor signal and the reference phase. Any one of the three phases could be the reference because of the constant phase shift of 120 degrees.

So in moving the cursor assembly across the triad of grid lines, the exact time that a zero crossing occurs differs and accordingly the counter 64 generates a different number for each occurrence. This phase metering technique is well known. It measures a zero crossing of one waveform with respect to a reference phase.

Concerning the driving of the lines of each X and Y grid of the grid assembly 12 for the coarse and fine digitizing, the CPU 36 can address any individual line on the pad or all of the lines on the pad sequentially through a series of address decoders. In order to address a particular grid line, a particular logic signal goes to latch assembly 73. In assembly 73 there are a series of addressable latches and each has eight output lines. Each one of the lines goes to a current switch of the Darlington type in current switch assembly 74 attached to one end of each grid line so the CPU 36 can turn on each one of those lines in sequence.

During the coarse digitizing process, one line is turned on and then turned off and the CPU 36 makes the comparison. If the resultant signal is not recognized as having the proper properties then the CPU 36 turns on the next line and so forth all the way across the grid. This is true for both the X and Y axes.

The other end of each grid line is connected through one of the current converters 66. Typically illustrated in FIG. 5 are the components 76 of the current converter 66. As previously discussed there are three basic phases. Each of the basic phases is connected to five current sources, the components of which are shown in FIG. 5. There are a total of 15 such current sources 76 and are typically connected through line 78 to the multiphase signal generator 42. These current sources 76 are connected to the grid lines in a pattern where every 15th line on an axis is tied to the same current source 76.

The phases coming out could be labeled $\phi_1 A$, $\phi_1 B$, $\phi_1 C$, $\phi_1 D$ and $\phi_1 E$ for each five current sources A–E and likewise for $\phi_2$ and for $\phi_3$. Therefore, the pattern across the grid is as follows. Where $\phi_3$ is on the first line, the grid line sequence is $\phi_3 A$, $\phi_1 A$, $\phi_2 A$, $\phi_3 B$, $\phi_1 B$, $\phi_2 B$ and so on until it ends with $\phi_3 E$, $\phi_1 E$ and then $\phi_2 E$. It should be observed that $\phi_1$ is in the center of each triad, so there is a looping process that feeds across the grid where every 15th line is tied together.

There is no current flowing in any one of those lines however, until the current switch 74 on the other end of the line is turned on and that is accomplished by the decoders of latch assembly 73. Of course, during the coarse digitizing process all of the current sources 76 are turned on to the highest possible value and there is no sine wave being generated at that time, since the counter 64 is stopped at that time. The highest value in one embodiment is in the order of 30 milliamperes.

In the fine digitizing sequence 15 lines, with 15 current sources of the FIG. 5 type, are turned on. There is always the same sequence of phases, with the phases alternating every three lines so that the first line that is turned on is always a $\phi_3$ line and the last line that is turned on is always a $\phi_2$ line. Therefore a triad of lines covers 3 phases. In practice if the first grid line is designated number one then the first sequence would be 1 through 15. The next sequence would be 4 through 18, the next 7 through 21 and so forth all the way across the grid for each axis. The system always works in multiples of three.

A one shot multivibrator in the latch assembly 73 provides a clock and controls the firing of the latched information into the current switch assembly 74 and on into the grid.

The center of the coil will always be within plus or minus 1½ line spaces of the center triad of the 15 lines. The center line is always the $\phi_1$ line. Once that triad is passed the next three lines are turned on and the last three lines in the opposite direction from which the cursor is moving are turned off. So the cursor coil 11 is always located within those same boundaries with respect to the center triad of the 15 lines. There are five triads which are turned on at one time. With respect to the center triad of the 15 lines the cursor will always be within plus or minus 1½ line spaces of the center line of that triad. Therefore, when the system does the coarse digitizing it identifies the line of interest and determines if that line will be the first, second or third line in a triad. By looking at which line it is closest to, the CPU 36 decides which of the 15 lines have to be turned on.

Due to the fact that there are various mechanical tolerances in the construction of the grid itself, especially over large size grids, it is very difficult to construct such a grid for high accuracy. The actual scale factor of the grid varies depending upon its size and on a five foot grid it can typically vary plus or minus 0.030 of an inch. The scale is measured and then incorporated into the program. Switches of the X and Y scale factor component 80 are used to automatically scale the digitized output result to compensate for the error.

It will be appreciated that although the preferred and alternative embodiments of the invention have been shown and described, other changes and modifications may be made thereto without departing from the spirit or scope of the invention as set forth in the following claims.

It is claimed:

1. A digitizing cursor assembly for use with a digitizing pad incorporating grid lines and digitizing circuitry for processing digitizing command signals and coordinate location signals remote from the cursor assembly, comprising:

a cursor housing;

a multiturn coil within the cursor housing for providing coordinate location signals induced in the coil as a function of proximately located electrically energized grid lines;

a cursor control panel mounted integral with the cursor housing including a multiplicity of control switches in electrical communication with a resistive network for providing a unique command signal as a function of each of the multiplicity of control switches engaged on the cursor control panel; and a coaxial cable in electrical communication with the switches and resistive network integrally mounted at one end with the cursor housing for providing an electrical path for both the unique command signals and the coordinate location signals from the cursor housing to remotely located digitizing circuitry for processing the command signals and coordinate location signals.

2. A digitizing cursor assembly, for cooperative operation with a digitizer tablet, comprising:

a coil for electromagnetic coupling with a digitizer tablet for providing alternating current cooridinate location signals;

a switch and resistor network in series connection with the coil for providing digitizing command signals including a matrix of n number of switches by m number of switches connected with n+m number of resistors such that for any one of nm number of switches engaged, a different resistive electrical path is provided through the switch and resistor network;

a capacitor in parallel connection with the switch and resistor network; and a coaxial cable for carrying both said alternating current coordinate location signals and said digitizing command signals, one conductor of which is connected to the coil and the other conductor which is connected to that side of the parallel circuit of the switch and resistor network and the capacitor not connected to the coil.

* * * * *

UNITED STATES PATENT AND TRADEMARK OFFICE
CERTIFICATE OF CORRECTION

PATENT NO. : 4,479,032
DATED : October 23, 1984
INVENTOR(S) : James Austin Parnell It is certified that error appears in the above-identified patent and that said Letters Patent is hereby corrected as shown below:

Abstract, line 29, "line-to-ling" should read --line-to-line--.

Column 1, line 14, "somtimes" should read --sometimes--.

Column 7, line 48, "Wheras" should read --Whereas--.

Column 8, line 11, "strumming" should read --strummed--.

Column 10, line 46, "56" should read --36--.

Column 12, line 49, "cooridinate" should read --coordinate--.

Signed and Sealed this

Eighth Day of October 1985

[SEAL]

Attest:

Attesting Officer

DONALD J. QUIGG

Commissioner of Patents and
Trademarks—Designate